United States Patent
Brown et al.

(10) Patent No.: US 8,533,053 B2
(45) Date of Patent: Sep. 10, 2013

(54) INVENTORY POOLING FOR MULTIPLE MERCHANTS

(75) Inventors: Michael G. Brown, Seattle, WA (US); Gregory Niejadlik, Seattle, WA (US); Stefan M. Haney, Seattle, WA (US); Luis Felipe Cabrera, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 186 days.

(21) Appl. No.: 13/044,823

(22) Filed: Mar. 10, 2011

(65) Prior Publication Data

US 2012/0233028 A1    Sep. 13, 2012

(51) Int. Cl.
  *G06Q 30/00*    (2012.01)
(52) U.S. Cl.
  USPC ........... 705/26.1; 705/26.41; 705/26.81; 705/26.82; 705/27.1; 705/28; 705/400
(58) Field of Classification Search
  USPC ........... 705/26.1, 27.1, 26.81, 26.82, 28, 705/400, 26.41
  See application file for complete search history.

(56) References Cited

U.S. PATENT DOCUMENTS

| | | | |
|---|---|---|---|
| 6,324,522 | B2 | 11/2001 | Peterson et al. |
| 7,289,969 | B1* | 10/2007 | Ballenger et al. ............. 705/28 |
| 2001/0047303 | A1 | 11/2001 | Greenstone |
| 2003/0093388 | A1* | 5/2003 | Albright ....................... 705/400 |
| 2005/0222887 | A1 | 10/2005 | Mohan et al. |
| 2007/0129985 | A1 | 6/2007 | Helmolt et al. |
| 2008/0301009 | A1* | 12/2008 | Plaster et al. .................. 705/28 |
| 2010/0262521 | A1 | 10/2010 | Robinson et al. |
| 2011/0173095 | A1* | 7/2011 | Kassaei et al. ............. 705/26.41 |
| 2011/0178898 | A1* | 7/2011 | Kopelman et al. ........... 705/27.1 |

* cited by examiner

*Primary Examiner* — Yogesh C Garg
(74) *Attorney, Agent, or Firm* — Thomas | Horstemeyer, LLP

(57) ABSTRACT

Disclosed are various embodiments for implementing inventory pooling for multiple merchants. A first inventory of an item held at a first fulfillment center on behalf of a first merchant is contributed to a common pool of inventory. A second inventory of the item held at a second fulfillment center on behalf of a second merchant is contributed to the common pool of inventory. Fulfillment of an order placed by a customer of the first merchant is initiated from the second inventory of the item that was contributed by the second merchant to the common pool of inventory.

21 Claims, 4 Drawing Sheets

INVENTORY POOLING FOR MULTIPLE MERCHANTS

BACKGROUND

An electronic marketplace facilitates sales of items by multiple merchants through a common network site. Some electronic marketplaces may be associated with a fulfillment network. A merchant who participates in the electronic marketplace may be able to ship inventory to one or more fulfillment centers in the fulfillment network in order to outsource order fulfillment. The inventory of the merchant remains identified as owned by the merchant and separated from other products while being held at the fulfillment centers.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to pooling of inventory by multiple merchants. Merchants may choose to have their orders fulfilled by a third-party fulfillment network. Such orders may be placed, for example, through an electronic marketplace in which the merchants participate, through network sites of the merchants, or through other channels of commerce. Typically, a merchant ships its inventory to one or more fulfillment centers in the fulfillment network, where the inventory is maintained separately and identified to the merchant. For example, the inventory of the merchant may be stocked on a separate shelf. However, such an arrangement may lead to higher shipping costs and/or other costs, especially for merchants who cannot afford to disperse inventory throughout the fulfillment network. As a non-limiting example, a merchant may maintain its entire inventory within domestic fulfillment centers, leading to relatively high shipping costs to fulfill international orders.

Various embodiments of the present disclosure enable a merchant to pool its inventory with other merchants who use the fulfillment network to fulfill orders. In some embodiments, pooling may be limited to items that are fungible, that is, items that are of the same kind and quality so as to be interchangeable. In place of identifying and separating items in a fulfillment center as being owned by a particular merchant, the merchant is given inventory credits that apply to the pooled inventory anywhere in the fulfillment network. In the following discussion, a general description of the system and its components is provided, followed by a discussion of the operation of the same.

Figure 1:
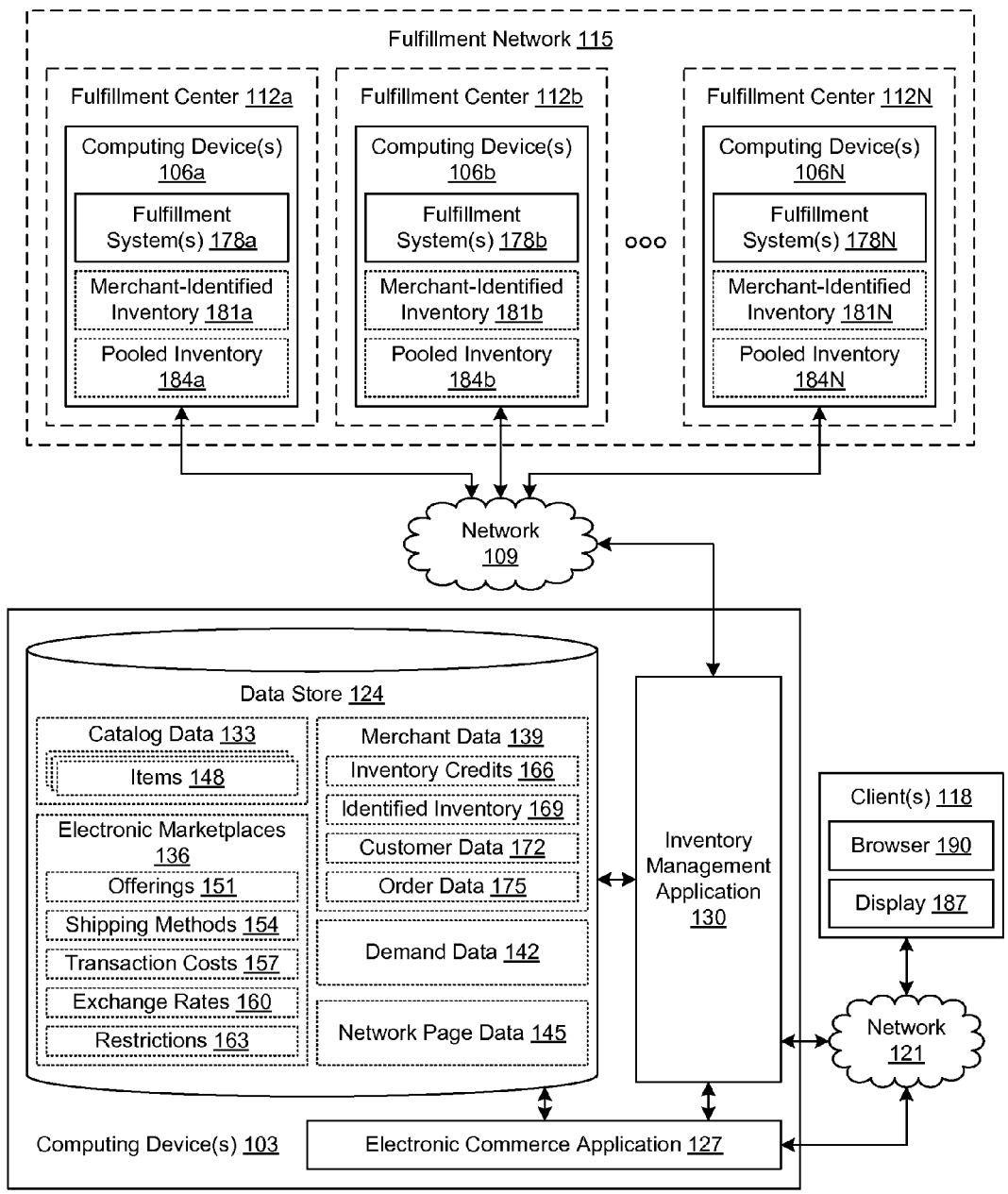
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with a plurality of computing devices 106a, 106b . . . 106N by way of a network 109. Each computing device 106a, 106b . . . 106N corresponds to a respective fulfillment center 112a, 112b . . . 112N within a fulfillment network 115. In addition, the computing device 103 is in data communication with one or more clients 118 by way of a network 121. The networks 109 and 121 include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 124 that is accessible to the computing device 103. The data store 124 may be representative of a plurality of data stores 124 as can be appreciated. The data stored in the data store 124, for example, is associated with the operation of the various applications and/or functional entities described below.

The components executed on the computing device 103, for example, include an electronic commerce application 127, an inventory management application 130, and other applications, services, processes, systems, engines, or functionality not discussed in detail herein. The electronic commerce application 127 is executed in order to facilitate the online purchase of items from one or more electronic marketplaces over the network 121. The electronic commerce application 127 also performs various backend functions associated with the online presence of an electronic marketplace in order to facilitate the online purchase of items. For example, the electronic commerce application 127 generates network pages such as, for example, web pages and/or other types of network content that are provided to clients 118 for the purposes of promoting and selecting items for purchase, rental, download, lease, or any other forms of consumption.

The inventory management application 130 is configured to manage inventories of items held at the fulfillment centers 112. To this end, the inventory management application 130 may facilitate contribution of items held at the fulfillment centers 112 on behalf of merchants to common pools of inventory. Further, the inventory management application 130 may determine which fulfillment center 112 will be used in fulfilling an order. When items are sub-optimally distributed across the fulfillment network 115, the inventory management application 130 may initiate transfers of inventory among fulfillment centers 112 in order to meet projected demand.

The data stored in the data store 124 includes, for example, catalog data 133, data relating to electronic marketplaces 136, merchant data 139, demand data 142, network page data 145, and potentially other data. The catalog data 133 may include information related to a plurality of items 148 offered in the electronic marketplace 136 or otherwise available for fulfillment through the fulfillment network 115. An item 148 may refer to a product, good, service, software download, multimedia download, social networking profile, or any combination, bundle, or package thereof, that may be offered for sale, purchase, rental, lease, download, and/or any other form of consumption as may be appreciated. The various data stored in catalog data 133 may include, for example, titles, descriptions, quantities, conditions, images, options, weights, customer reviews, customer ratings, keywords, shipping restrictions, prices, tax classifications, unique identifiers, and any other data related to items 148.

Each electronic marketplace 136 may correspond to a distinct network site targeting a geographic region that offers items 148 for sale by a plurality of merchants. For example, separate electronic marketplaces 136 may be established that target various states, countries, continents, etc. An electronic marketplace 136 is said to be a foreign marketplace relative to a merchant if it targets a different geographic region from the geographic region in which the merchant is based. Each electronic marketplace 136 may be associated with various data such as, for example, offerings 151, shipping methods 154, transaction costs 157, exchange rates 160, restrictions 163, and/or other data.

The offerings 151 relate to items 148 in the catalog data 133 that are specifically offered by a merchant within an electronic marketplace 136. The offerings 151 may be associated with different prices, options, lead times, shipping and handling rates, etc. compared with offerings 151 of the same item 148 within another electronic marketplace 136. The shipping methods 154 describe the options available for shipping in the electronic marketplace 136. Because electronic marketplaces 136 may target distinct countries, different shipping carriers may provide different levels of service at different prices.

The transaction costs 157 relate to the various fees, charges, commissions, etc. that the operator of the electronic marketplace 136 (and/or fulfillment network 115) may impose for taking and/or fulfilling an order. Some costs may be governmental, such as taxes, tariffs, duties, etc., while others may be imposed by the operator to cover costs and make a profit. It is noted that such transaction costs 157 may vary among electronic marketplaces 136. Further, such transaction costs 157 may differ depending on the merchant.

The exchange rates 160 provide various rates for currency exchange associated with the electronic marketplace 136. For example, the electronic marketplace 136 may price items 148 according to one currency, and a merchant may list items 148 priced in another currency. The prices of the merchant may be converted to the currency of the electronic marketplace 136, for example, by the electronic commerce application 127, according to the exchange rates 160. Further, if the exchange rates 160 fluctuate, the pricing in the electronic marketplace 136 may be adjusted accordingly to preserve a return to the merchant in the preferred local currency of the merchant.

The restrictions 163 describe import, export, and/or other restrictions that may affect the electronic marketplace 136. As a non-limiting example, an electronic marketplace 136 targeting a particular country may refuse to sell lithium-ion batteries. As another non-limiting example, an electronic marketplace 136 that is considered a foreign marketplace for a merchant may refuse to list software that includes high-grade encryption technology where the country of the merchant has prohibited export of such software.

The merchant data 139 includes various data relating to merchants who have offered items 148 for ordering through electronic marketplaces 136 and/or for fulfillment through the fulfillment network 115. The merchant data 139 may include, for example, data relating to inventory credits 166, identified inventory 169, customer data 172, order data 175, and/or other data. The inventory credits 166 describe a number of credits for items 148 that the merchant has contributed to a common pool of inventory. In one embodiment, one item 148 corresponds to one credit, but one item 148 may correspond to any number of credits in other embodiments. The identified inventory 169 describes items 148 in fulfillment centers 115 that are identified to the merchant and have not been contributed to common pools of inventory.

The customer data 172 may include various data relating to customers of the merchant. Such data may include names, shipping addresses, billing addresses, payment instruments, contact information, account information, and so on. The order data 175 may include various data relating to orders placed with the merchant. Such data may include items 148, selected options, quantities, shipping methods, payment status, destination address, and so on.

The demand data 142 includes data that may be used in order to project demands for items 148 at specific fulfillment centers 112 in the fulfillment network 115. To this end, the demand data 142 may indicate which items 148 have a relatively high velocity at certain fulfillment centers 112 and a relatively low velocity at other fulfillment centers 112. The network page data 145 includes data that may be used in the generation of network pages by the electronic commerce application 127 and/or the inventory management application 130. Such data may include templates, code, images, audio, video, hypertext markup language (HTML), extensible markup language (XML), JavaScript, cascading style sheets (CSS), and/or other data.

The fulfillment centers 112 in the fulfillment network 115 may correspond to materials handling facilities that may include one or more of, but are not limited to, warehouses, distribution centers, cross-docking facilities, order fulfillment facilities, packaging facilities, shipping facilities, or other facilities or combination of facilities for performing one or more functions of material (inventory) handling. In various embodiments, the fulfillment centers 112 may be geographically dispersed. For example, the fulfillment centers 112 may be distributed among many countries. However, any one of the fulfillment centers 112 may fulfill orders destined for multiple countries. Some fulfillment centers 112 may be considered forward-deploy fulfillment centers 112, which stock relatively high velocity items 148 for fast shipping to metropolitan areas.

Each computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations (e.g., fulfillment centers 112). For purposes of convenience, the computing device 106 is referred to herein in the singular. Even though each computing device 106 is referred to in the singular, it is understood that a plurality of computing devices 106 may be employed in the various arrangements as described above.

Various applications and/or other functionality may be executed in the computing device 106 according to various embodiments. Also, various data may be stored in a data store that is accessible to the computing device 106. The components executed on the computing device 106, for example, include a respective one of a plurality of fulfillment systems 178a, 178b . . . 178N, and other applications, services, processes, systems, engines, or functionality not discussed in detail herein. The fulfillment system 178 may be executed to facilitate inventory control, pick orchestration, control of automated equipment, packaging of orders, shipping of orders, and may perform other tasks. As an example, the fulfillment system 178 may direct the transferring of inventory from one fulfillment center 112 to another fulfillment center 112. As another example, the fulfillment system 178 may direct inventory that is currently separated and identified with a merchant to be moved to a location in the fulfillment center 112 that is associated with a common pool of inventory.

The computing device 106 may also maintain data relating to the respective merchant-identified inventory 181a, 181b . . . 181N, data relating to the respective pooled inventory 184a, 184b . . . 184N, and/or other data. The merchant-identified inventory 181 corresponds to the items 148 that are recognized as being owned by the merchant and reserved for fulfilling orders of the merchant in the respective fulfillment center 112. The pooled inventory 184 corresponds to items 148 that have been contributed by participating merchants to a common pool of inventory in exchange for inventory credits 166.

The client 118 is representative of a plurality of client devices that may be coupled to the network 121. In various examples, the client 118 may correspond to a merchant or a customer of a merchant. The client 118 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. In some embodiments, the client 118 may correspond to a server computer of the merchant. The client 118 may include a display 187. The display 187 may comprise, for example, one or more devices such as cathode ray tubes (CRTs), liquid crystal display (LCD) screens, gas plasma-based flat panel displays, LCD projectors, or other types of display devices, etc.

The client 118 may be configured to execute various applications such as a browser 190 and/or other applications. The browser 190 may be executed in a client 118, for example, to access and render network pages, such as web pages, or other network content served up by the computing device 103 and/or other servers, thereby generating a rendered network page on the display 187. The client 118 may be configured to execute applications beyond browser 190 such as, for example, email applications, instant message applications, and/or other applications.

Next, a general description of the operation of the various components of the networked environment 100 is provided. To begin, a merchant may ship items 148 corresponding to its identified inventory 169 to one or more fulfillment centers 112 in the fulfillment network 115. The items 148 are held in the fulfillment centers 112 on behalf of the merchant in merchant-identified inventory 181. Corresponding offerings 151 may be placed in one or more electronic marketplaces 136.

Orders placed by customers at clients 118 through the electronic commerce application 127 may then be fulfilled from the merchant-identified inventory 181. The fulfillment may be orchestrated by the inventory management application 130. Although orders are generally described herein as being placed through an electronic marketplace 136 and the electronic commerce application 127, it is understood that orders placed elsewhere may be delivered to the inventory management application 130 for fulfillment through the fulfillment network 115.

An order may be placed through a particular merchant in an electronic marketplace 136 or irrespective to a merchant. Where multiple merchants have offerings 151 in an electronic marketplace 136 and the customer has not specified a particular merchant, the electronic commerce application 127 may select the offering 151 associated with a lowest total cost to the customer. Where the lowest total cost is the same among multiple merchants, the electronic commerce application 127 may select an offering 151 on a random or other basis to assure an even distribution. Alternatively, the electronic commerce application 127 may prefer merchant-identified inventory 181 or may use another approach to merchant selection for an order.

A merchant may decide to contribute inventory to the pooled inventory 184 and thereby receive inventory credits 166 in return. To this end, the inventory management application 130 may generate various administrative interfaces (e.g., embodied in network pages) to facilitate inventory management by clients 118. When an item 148 is contributed to pooled inventory 184, it is no longer identified as owned by the specific merchant and can be used in fulfilling orders for other merchants. When an item 148 is removed from pooled inventory 184, the inventory credits 166 for the merchant are debited. Items 148 may be removed from pooled inventory 184 when they are retrieved for fulfilling orders. In addition, items 148 may be removed under direction of the merchant in accordance with terms established by the operator of the fulfillment network 115.

By pooling inventory, merchants can advantageously decrease their shipping costs, which may increase overall sales. As a non-limiting example, a first merchant in the United States may stock widgets in a fulfillment center 112 in the U.S. If the merchant were to offer the widget for sale in an electronic marketplace 136 that targets Germany, the international shipping costs may be too high for the merchant to make sales. However, it may be too speculative for the merchant to anticipate sales in Germany and ship the widgets to a fulfillment center 112 in Germany in advance.

Suppose that a similar situation exists for a second merchant in Germany who also sells the same, fungible, widget. Suppose further that both merchants elect to pool their inventory and receive inventory credits 166 in return. Consequently, a customer in Germany (or elsewhere in Europe) may choose to purchase the widget from the first merchant, and the widget can be shipped from the inventory originally contributed by the second merchant in a German fulfillment center 112. The shipping costs would be markedly reduced, although they may be higher than from the second merchant originally. Likewise, the second merchant may be able to obtain more sales in the United States. The overall sales for both merchants may increase based on name recognition, superior merchandising, etc. in the respective markets in which they are newly competitive.

A merchant may be so competitive that the pooled inventory 184 in the home fulfillment region of another merchant may be exhausted. To prevent such a situation, the operator of the fulfillment network 115 may initiate transfers among fulfillment centers 112 in order to meet projected demand and re-balance overall supply. Such transfers may be initiated manually or automatically by the inventory management application 130 in response to monitoring demand data 142. Although such transfers may incur shipping expenses, shipping of multiple items 148 is generally far less expensive than point-to-point shipping of single items 148 for retail orders. The operator may account for such shipping expenses in the transaction costs 157, for example, for pooling items 148 and/or including offerings 151 in certain electronic marketplaces 136, etc.

Despite re-balancing inventory, a situation may exist where a shipping cost is greater to fulfill an order of a merchant from pooled inventory 184 than if the merchant had chosen not to participate. This risk may be placed upon the merchant, or the operator of the fulfillment network 115 may elect to absorb at least some of the additional shipping expense. Again, such expenses may be built into the transaction costs 157.

Additionally, in some cases, it may be less expensive to ship an item 148 from merchant-identified inventory 181 of a different merchant than from pooled inventory 184 or merchant-identified inventory 181 accessible to a merchant whose order is being fulfilled. Where it makes financial sense, the operator of the fulfillment network 115 may purchase the item 148 from a different merchant to fulfill the order. An inventory credit 166 may be deducted for the merchant, and the operator of the fulfillment network 115 may decide to resell the additional item 148.

Figure 2:
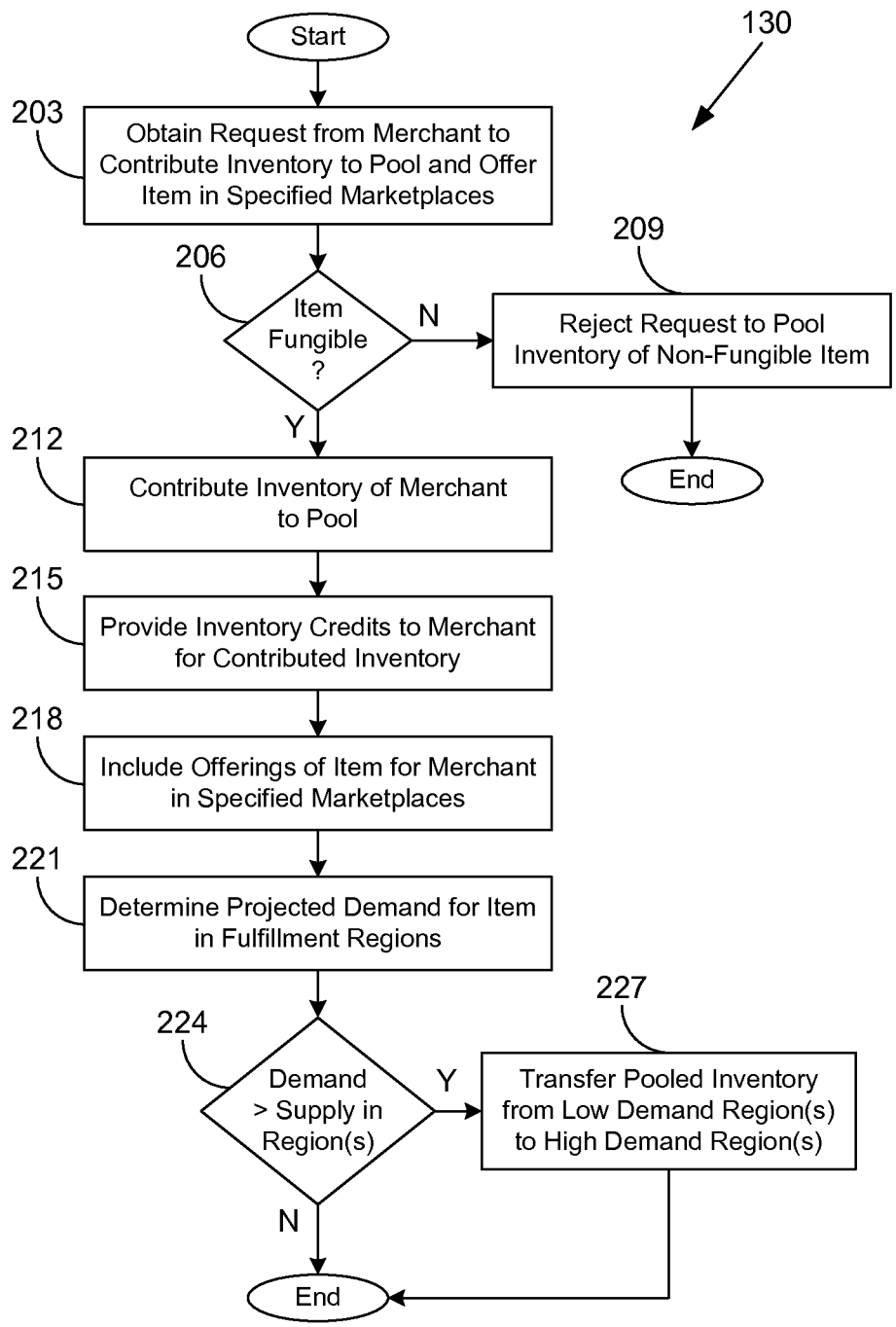
FIGS. 2 and 3 are flowcharts illustrating examples of functionality implemented as portions of an inventory management application executed in a computing device in the networked environment of FIG. 1 according to various embodiments of the present disclosure.

Referring next to FIG. 2, shown is a flowchart that provides one example of the operation of a portion of the inventory management application 130 according to various embodiments. It is understood that the flowchart of FIG. 2 provides merely an example of the many different types of functional arrangements that may be employed to implement the operation of the portion of the inventory management application 130 as described herein. As an alternative, the flowchart of FIG. 2 may be viewed as depicting an example of steps of a method implemented in the computing device 103 (FIG. 1) according to one or more embodiments.

Beginning with box 203, the inventory management application 130 obtains a request from a merchant to contribute at least a portion of its identified inventory 169 (FIG. 1) to a common pool of inventory. Although the request may involve multiple items 148 (FIG. 1), the following discussion relates to inventory of a single item 148 for simplicity. In some examples, the merchant may wish to contribute its entire identified inventory 169 involving multiple items 148 to common pools of inventory. In addition, the request may specify that the merchant wishes to offer the item 148 in one or more specified electronic marketplaces 136 (FIG. 1). Such electronic marketplaces 136 may have been cost-prohibitive to serve with the previous identified inventory 169 placements of the merchants.

In box 206, the inventory management application 130 determines whether the item 148 to which the request relates is deemed to be fungible. In other words, the inventory management application 130 determines whether the item 148 is of a consistent kind or quality so as to be interchangeable with units of the same item 148 contributed by other merchants. In one embodiment, only new items 148 having the same unique identifier in the catalog data 133 (FIG. 1) may be considered fungible. If the item 148 is not considered fungible, the inventory management application 130 proceeds to box 209 and rejects the request to contribute the non-fungible item 148 to a common pool of inventory. Thereafter, the portion of the inventory management application 130 ends.

Otherwise, if the item 148 is deemed fungible, the inventory management application 130 continues to box 212 and contributes the identified inventory 169 of the merchant to a common pool of inventory according to the request. In box 215, the inventory management application 130 provides inventory credits 166 (FIG. 1) to the merchant for the inventory that has been contributed to the pool. In box 218, the inventory management application 130 includes offerings 151 (FIG. 1) of the item 148 for the merchant in the electronic marketplaces 136 designated by the merchant. To this end, prices may be calculated for the offerings 151 that include applicable transaction costs 157 (FIG. 1) and account for the relevant exchange rates 160 (FIG. 1). Offerings 151 may be excluded from certain electronic marketplaces 136 based on applicable restrictions 163 (FIG. 1).

In box 221, the inventory management application 130 determines the projected demand for the item 148 in the fulfillment regions served by the respective fulfillment centers 112 (FIG. 1) of the fulfillment network 115 (FIG. 1). In box 224, the inventory management application 130 determines whether the projected demand exceeds the current supply in the fulfillment region(s). If the projected demand exceeds the current supply, and if supply exceeds demand in other fulfillment regions, the inventory management application 130 may continue to box 227 and transfer pooled inventory 184 (FIG. 1) from fulfillment centers 112 that serve low-demand fulfillment regions to fulfillment centers 112 that serve high-demand fulfillment regions.

In other words, the inventory management application 130 may carry out a re-balancing of the pooled inventory 184 so that it is distributed according to projected demand. While such a re-balancing may be associated with a request to contribute or remove pooled inventory 184, re-balancing may be performed in response to other events or periodically as desired. The transfer of pooled inventory 184 between fulfillment centers 112 may be less costly than shipping directly from fulfillment centers 112 that are distant from the destination addresses. Thereafter, the portion of the inventory management application 130 ends. If the inventory management application 130 determines in box 224 that no re-balancing is required, the inventory management application 130 also ends.

Figure 3:
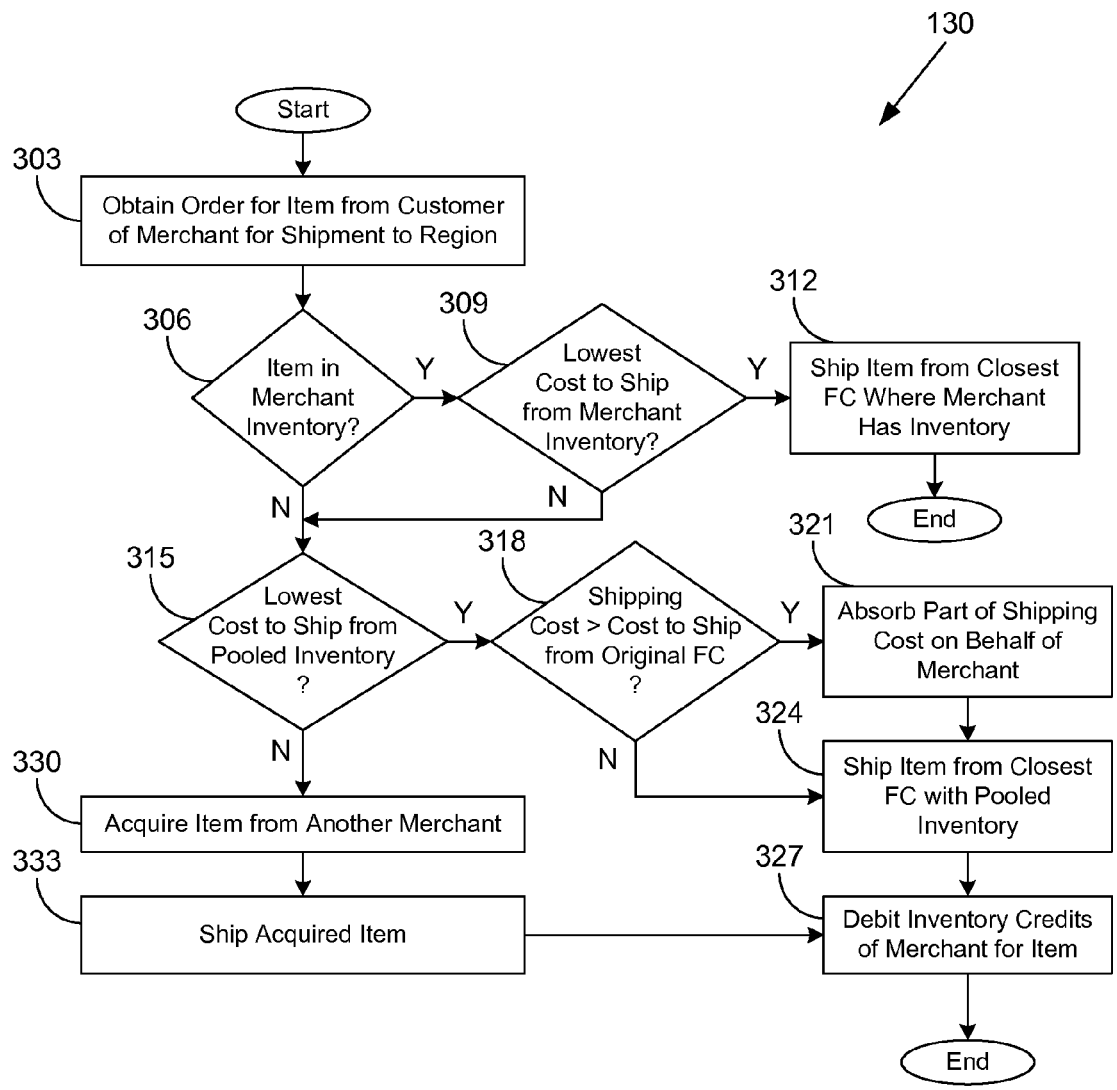

Turning now to FIG. 3, shown is a flowchart that provides one example of the operation of another portion of the inventory management application 130 according to various embodiments. It is understood that the flowchart of FIG. 3 provides merely an example of the many different types of functional arrangements that may be employed to implement the operation of the other portion of the inventory management application 130 as described herein. As an alternative, the flowchart of FIG. 3 may be viewed as depicting an example of steps of a method implemented in the computing device 103 (FIG. 1) according to one or more embodiments.

Beginning with box 303, the inventory management application 130 obtains an order for an item 148 (FIG. 1) from a customer of a merchant for shipment to a particular fulfillment region. Although this example involves a single item 148 for simplicity, it is understood that the inventory management application 130 may handle orders for multiple items 148. In box 306, the inventory management application 130 determines whether the item 148 is included within identified inventory 169 (FIG. 1) of the merchant. If the item 148 is included within the identified inventory 169 of the merchant, the inventory management application 130 continues to box 309 and determines whether the lowest shipping cost would result from shipping the item 148 from a fulfillment center 112 (FIG. 1) in which the item 148 is held on behalf of the merchant in merchant-identified inventory 181 (FIG. 1).

If the lowest shipping cost would result from shipping the item 148 from a fulfillment center 112 in which the item 148 is in merchant-identified inventory 181, the inventory management application 130 continues to box 312. In box 312, the inventory management application 130 directs the respective fulfillment system 178 (FIG. 1) of the closest fulfillment center 112 (or otherwise the fulfillment center 112 associated with the lowest cost for shipping) where the item 148 is in merchant-identified inventory 181 to ship the item 148 to the customer. Thereafter, the portion of the inventory management application 130 ends. If the lowest shipping cost would not result from shipping the item 148 from a fulfillment center 112 in which the item 148 is in merchant-identified inventory 181, or if the item 148 is not available in identified inventory 169 of the merchant, the inventory management application 130 moves to box 315.

In box 315, the inventory management application 130 determines whether the lowest shipping cost would result from shipping the item 148 from pooled inventory 184 (FIG. 1). If the lowest shipping cost would result from shipping the item 148 from pooled inventory 184, the inventory management application 130 continues to box 318. In box 318, the inventory management application 130 determines whether the shipping cost for the item 148 will exceed the shipping cost for the item 148 if the item 148 were shipped from the fulfillment center 112 to which the merchant originally sent its inventory. If the shipping cost will exceed that baseline cost, the inventory management application 130 continues to box 321 and absorbs part of the shipping cost on behalf of the merchant so that the merchant would not be charged for the excess. This task is optional and may be desirable to ensure that participation in inventory pooling does not result in higher shipping charges. The inventory management application 130 then proceeds to box 324. If the shipping cost will not exceed the baseline cost, the inventory management application 130 also proceeds to box 324.

In box 324, the inventory management application 130 directs the respective fulfillment system 178 of the closest fulfillment center 112 (or otherwise the fulfillment center 112 associated with the lowest cost for shipping) where the item 148 is in pooled inventory 184 to ship the item 148 to the customer. In box 327, the inventory management application 130 debits the inventory credits 166 of the merchant for the item 148. Thereafter, the portion of the inventory management application 130 ends.

Otherwise, if the inventory management application 130 determines in box 315 that the lowest shipping cost would not result from shipping from pooled inventory 184, the inventory management application 130 transitions to box 330 and acquires the item 148 from another merchant, where the item 148 is held in merchant-identified inventory 181. By doing so, the operator of the fulfillment network 115 may engage in arbitrage and profit from the difference in shipping costs. Such savings may be shared with the customer and/or merchant or kept by the operator of the fulfillment network 115. In box 333, the inventory management application 130 directs the respective fulfillment system 178 to ship the acquired item 148 to the customer. The inventory management application 130 then moves to box 327 and debits the inventory credits 166 of the merchant for the item 148. Thereafter, the portion of the inventory management application 130 ends.

Figure 4:
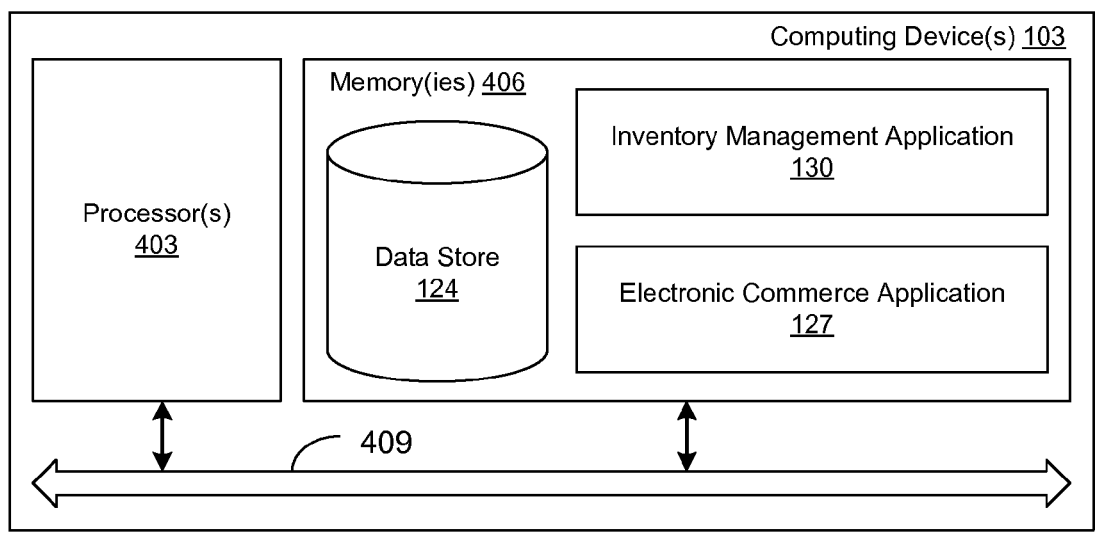
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce application 127, the inventory management application 130, and potentially other applications. Also stored in the memory 406 may be a data store 124 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 or 121 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce application 127, the inventory management application 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the inventory management application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 127 and the inventory management application 130, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that obtains a request from a first merchant to contribute a first inventory of a product to a common pool of inventory of fungible products, the first inventory of the product being held on behalf of the first merchant in at least one fulfillment center in a fulfillment network;

code that determines whether the product is fungible with respect to the common pool of inventory of fungible products;

code that contributes the first inventory of the product to the common pool of inventory of fungible products in response to the request when the product is fungible, the common pool of inventory of fungible products including a second inventory of the product contributed by a second merchant and held in at least one other fulfillment center in the fulfillment network;

code that, in response to determining the product is fungible, associates a quantity of inventory credits for the product with the first merchant, the quantity corresponding to the first inventory of the product contributed by the first merchant to the common pool of inventory of fungible products;

code that, in response to determining the product is fungible, initiates a transfer of at least a portion of the common pool of inventory of fungible products held at a first fulfillment center in the fulfillment network to a second fulfillment center in the fulfillment network in response to a projected demand for the product in a region served by the second fulfillment center;

code that, in response to determining the product is fungible, obtains an order for the product from a customer of the first merchant in the region served by the second fulfillment center;

code that, in response to determining the product is fungible, initiates fulfillment of the order from the common pool of inventory of fungible products held at the second fulfillment center;

code that, in response to determining the product is fungible, debits the quantity of inventory credits associated with the first merchant in response to the order; and wherein the order is fulfilled from the second inventory of the product contributed by the second merchant, and a quantity of inventory credits associated with the second merchant is not debited in response to the order.

2. A system, comprising:
   at least one computing device; and
   an inventory management application executable in the at least one computing device, the inventory management application comprising:
   logic that contributes a first inventory of a fungible item held at a first fulfillment center on behalf of a first merchant to a common pool of inventory of fungible items, wherein the fungible item is considered fungible with respect to the common pool of inventory of fungible items if the fungible item shares a unique identifier with another fungible item within the common pool of inventory of fungible items;
   logic that contributes a second inventory of the fungible item held at a second fulfillment center on behalf of a second merchant to the common pool of inventory of fungible items; and
   logic that, in response to receiving an order for the fungible item placed by a customer of the first merchant, initiates fulfillment of the order from the second inventory of the fungible item that was contributed to the common pool of inventory of fungible items.

3. The system of claim 2, wherein the logic that contributes the first inventory of the fungible item and the logic that contributes the second inventory of the fungible item are further configured to associate a respective quantity of inventory credits with a respective merchant, and the respective quantity of inventory credits corresponds to a respective quantity of the item contributed to the common pool of inventory of fungible items by the respective merchant.

4. The system of claim 3, wherein the logic that initiates fulfillment of the order is further configured to debit a quantity of the fungible item corresponding to the order from the respective quantity of inventory credits associated with the first merchant.

5. The system of claim 2, wherein the order is fulfilled from the second fulfillment center.

6. The system of claim 2, wherein the inventory management application further comprises logic that initiates a transfer of at least a portion of the common pool of inventory of fungible items held at the second fulfillment center to a third fulfillment center.

7. The system of claim 6, wherein a destination address associated with the order is in a region served by the third fulfillment center, and the order is fulfilled from the third fulfillment center.

8. The system of claim 6, wherein the transfer is initiated automatically in response to a projected demand for the fungible item in a region served by the third fulfillment center.

9. The system of claim 2, wherein the first fulfillment center serves a first region associated with a first electronic marketplace, and the second fulfillment center serves a second region associated with a second electronic marketplace.

10. The system of claim 9, wherein the first region corresponds to a first country, and the second region corresponds to a second country.

11. The system of claim 2, wherein the first fulfillment center and the second fulfillment center are operated by an entity that also operates at least one electronic marketplace in which the first merchant participates and at least one electronic marketplace in which the second merchant participates.

12. The system of claim 11, wherein the inventory management application further comprises:
   logic that initiates fulfillment of another order for the fungible item placed by a customer of the second merchant from the first inventory of the fungible item that was contributed to the common pool of inventory of fungible items; and
   wherein a destination address associated with the other order is in a region served by the second fulfillment center, the other order is fulfilled from the first fulfillment center, and the entity absorbs at least a portion of a cost associated with shipping the other order.

13. The system of claim 2, wherein the inventory management application further comprises logic that adjusts a price in a first currency for a respective offering of the fungible item by the first merchant in each one of a subset of electronic marketplaces to compensate the first merchant for an exchange rate fluctuation between the first currency and a second currency so as to preserve a desired return for the first merchant in the second currency.

14. A method, comprising the steps of:
   obtaining, in at least one computing device, a request from a merchant to contribute an inventory of a fungible item to a common pool of inventory of fungible items, the inventory of the fungible item being held on behalf of the merchant in at least one fulfillment center in a fulfillment network;
   determining, in the at least one computing device, whether the fungible item is fungible with respect to the common pool of inventory of fungible items;
   contributing, in the at least one computing device, the inventory of the fungible item to the common pool of inventory of fungible items in response to the request, the common pool of inventory of fungible items including another inventory of the fungible item contributed by at least one other merchant and held in at least one other fulfillment center in the fulfillment network; and
   associating, in the at least one computing device, a quantity of inventory credits for the fungible item with the merchant, the quantity corresponding to the inventory of the fungible item contributed by the merchant to the common pool of inventory of fungible items.

15. The method of claim 14, further comprising the step of initiating, in the at least one computing device, a transfer of at least a portion of the common pool of inventory of fungible items held at a first fulfillment center in the fulfillment network to a second fulfillment center in the fulfillment network in response to a projected demand for the fungible item in a region served by the second fulfillment center.

16. The method of claim 14, wherein the request designates a subset of a plurality of electronic marketplaces in which the merchant requests to offer the fungible item for order and each of the electronic marketplaces targets a distinct region.

17. The method of claim 16, further comprising the step of adjusting, in the at least one computing device, a price in a first currency for a respective offering of the fungible item by the merchant in each one of the subset of the electronic marketplaces to compensate for an exchange rate fluctuation between the first currency and a second currency so as to preserve a desired return for the merchant in the second currency.

18. The method of claim 14, further comprising the steps of:
   obtaining, in the at least one computing device, an order for the fungible item from a customer of the merchant in a region served by the at least one other fulfillment center;

initiating, in the at least one computing device, fulfillment of the order from the common pool of inventory of fungible items held at the at least one other fulfillment center; and debiting, in the at least one computing device, the quantity of inventory credits associated with the merchant in response to the order.

19. The method of claim 14, further comprising the steps of:

obtaining, in the at least one computing device, an order for the fungible item from a customer of the merchant in a region served by a fulfillment center in the fulfillment network;

purchasing, in the at least one computing device, the fungible item from another merchant that is being held on behalf of the other merchant in the fulfillment center;

initiating, in the at least one computing device, fulfillment of the order from the fulfillment center using the fungible item purchased from the other merchant; and debiting, in the at least one computing device, the quantity of inventory credits associated with the merchant in response to the order.

20. The method of claim 14, wherein no fungible item in the common pool of inventory of fungible items is identifiably owned by any one merchant participating in the common pool of inventory of fungible items.

21. The method of claim 14, further comprising the step of:

rejecting, in the at least one computing device, the request when the fungible item is not fungible with respect to the common pool of inventory.

* * * * *